(12) United States Patent
Hirai

(10) Patent No.: US 7,684,636 B2
(45) Date of Patent: Mar. 23, 2010

(54) EDGE CORRECTION APPARATUS, EDGE CORRECTION METHOD, PROGRAM, AND STORAGE MEDIUM

(75) Inventor: Shinya Hirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/040,623

(22) Filed: Feb. 29, 2008

(65) Prior Publication Data

US 2008/0159647 A1    Jul. 3, 2008

Related U.S. Application Data

(63) Continuation of application No. 10/347,979, filed on Jan. 21, 2003, now Pat. No. 7,391,919.

(30) Foreign Application Priority Data

| Jan. 23, 2002 | (JP) | ............................. 2002-014638 |
| Jan. 23, 2002 | (JP) | ............................. 2002-014642 |

(51) Int. Cl.
   *G06K 9/40* (2006.01)
(52) U.S. Cl. .................. 382/266; 382/263; 382/275
(58) Field of Classification Search ............ None
   See application file for complete search history.

(56) References Cited

U.S. PATENT DOCUMENTS

| 4,605,969 | A |   | 8/1986 | Green |
| 4,994,923 | A |   | 2/1991 | Itoh et al. |
| 5,170,249 | A |   | 12/1992 | Ohtsubo et al. |
| 5,508,741 | A |   | 4/1996 | Hieda |
| 5,548,330 | A |   | 8/1996 | Hieda et al. |
| 5,663,617 | A |   | 9/1997 | Kobayashi |
| 6,148,116 | A | * | 11/2000 | Park et al. ............ 382/266 |
| 6,175,596 | B1 |  | 1/2001 | Kobayashi et al. |
| 6,415,053 | B1 |  | 7/2002 | Norimatsu |
| 6,489,938 | B1 | * | 12/2002 | Ito .......................... 345/63 |

(Continued)

FOREIGN PATENT DOCUMENTS

EP       0 859 518 A1    8/1998

(Continued)

OTHER PUBLICATIONS

Japanese Office Action dated Jan. 23, 2006 corresponding to JP Application No. 2002-014638.

(Continued)

*Primary Examiner*—Charles Kim
(74) *Attorney, Agent, or Firm*—Canon USA Inc IP Division

(57) ABSTRACT

This invention has as its object to provide an edge correction apparatus which can execute base clip processes optimal to different noise levels depending on the level of an input signal. To this end, an apparatus has a high-frequency extraction circuit for extracting a high-frequency signal equal to or more than a predetermined frequency from an input signal, a suppression circuit for suppressing signal components equal to or less than a suppression level from the extracted high-frequency signal, a setting circuit for setting the suppression level in correspondence with the signal level of the input signal, and a high-frequency emphasis circuit for emphasizing the high-frequency signal suppressed by the suppression circuit.

2 Claims, 20 Drawing Sheets

U.S. PATENT DOCUMENTS

| | | |
|---|---|---|
| 6,498,863 B1 | 12/2002 | Gaidoukevitch et al. |
| 2003/0016855 A1* | 1/2003 | Shinbata .................... 382/132 |
| 2006/0066735 A1 | 3/2006 | Hirai |

FOREIGN PATENT DOCUMENTS

| | | |
|---|---|---|
| JP | 62-127172 | 8/1987 |
| JP | 02-066077 | 5/1990 |
| JP | 03-236684 | 10/1991 |
| JP | 03-278684 | 12/1991 |
| JP | 04-051675 | 2/1992 |
| JP | 05-276386 | 10/1993 |
| JP | 05-347723 | 12/1993 |
| JP | 06-205429 | 7/1994 |
| JP | 07-327152 | 12/1995 |
| JP | 10-164396 | 6/1998 |
| JP | 10-229546 | 8/1998 |
| JP | 11-112837 | 4/1999 |
| JP | 11-284880 | * 10/1999 |
| JP | 2001-078222 | 3/2001 |

OTHER PUBLICATIONS

Japanese Office Action dated Jan. 23, 2006 corresponding to JP Application No. 2002-014642.
English Abstract for JPA 11-112837.
English Abstract for JPA 03-236684.
English Abstract for JPA 05-347723.
English Abstract for JPA 10-229546.
English Abstract for JPA 2001-078222.
English Abstract for JPA 07-327152.
English Abstract for JPA 06-205429.
English Abstract for JPA 03-278684.
English Abstract for JPA 04-051675.
English Abstract for JPA 05-276386.
English Abstract for JPA 10-164396.

* cited by examiner

FIG. 3

| R11 | G12 | R13 | G14 |
| --- | --- | --- | --- |
| G21 | B22 | G23 | B24 |
| R31 | G32 | R33 | G34 |
| G41 | B42 | G43 | B44 |

F I G. 12
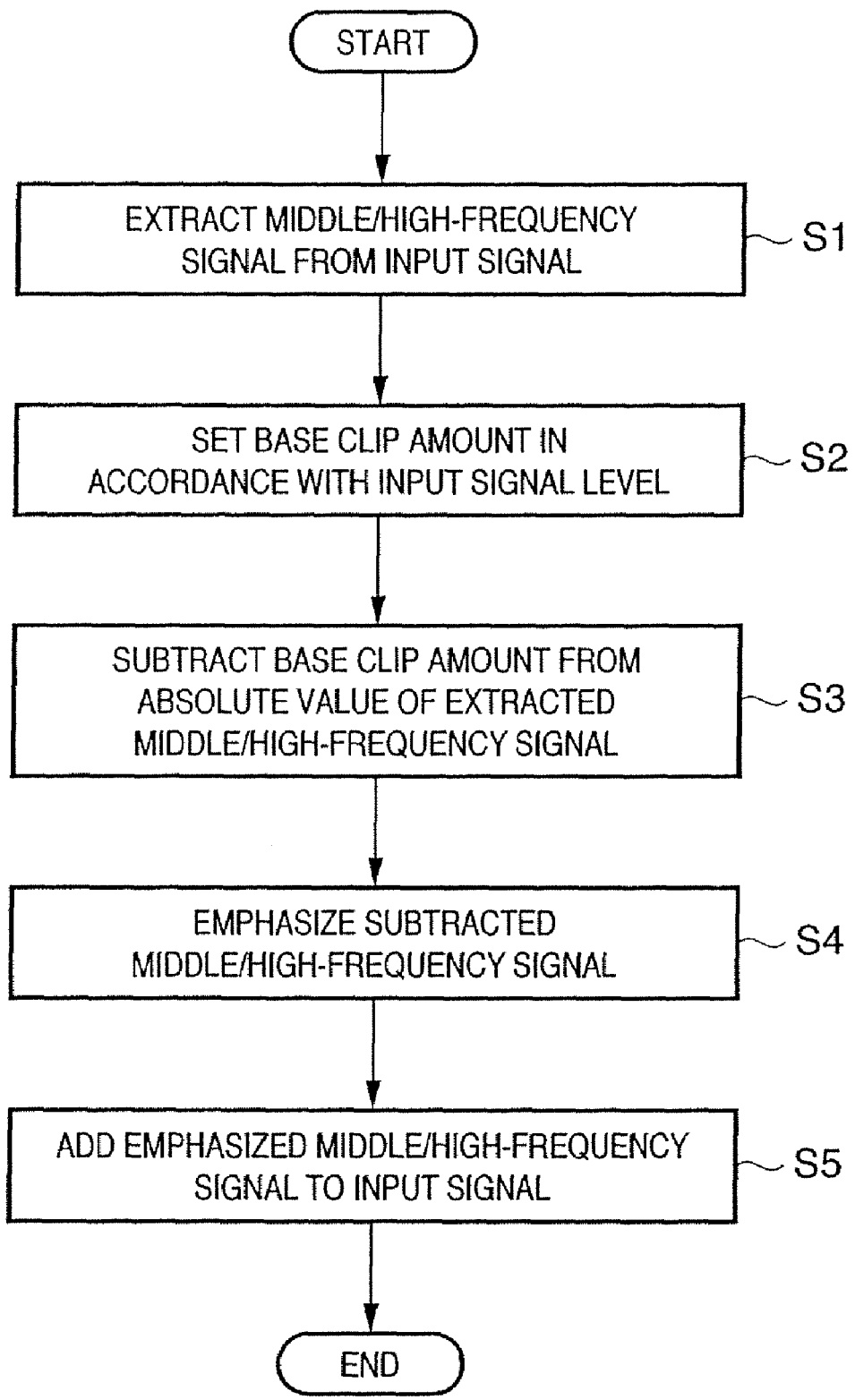

PRIOR ART

EDGE CORRECTION APPARATUS, EDGE CORRECTION METHOD, PROGRAM, AND STORAGE MEDIUM

This application is a continuation of prior application Ser. No. 10/347,979, filed Jan. 21, 2003, which is incorporated by reference herein in its entirety as if fully set forth herein and to which priority under 35 U.S.C. §120 is claimed. This application claims a benefit of priority under 35 U.S.C. §119 based on Japanese Patent Application Nos. 2002-014638, filed on Jan. 23, 2002, and 2002-014642, filed Jan. 23, 2002, which are hereby incorporated by reference herein in their entirety as if fully set forth herein.

FIELD OF THE INVENTION

The present invention relates to an edge correction apparatus, edge correction method, program, and storage medium, used for a digital camera, video camera, and the like.

BACKGROUND OF THE INVENTION

Since a video signal obtained from a solid-state image sensing element such as a CCD or the like contains noise components, an edge emphasis process also emphasizes such noise components, resulting in an image with a poor S/N.

Conventionally, in order to avoid such problem, a base clip process is executed in the edge emphasis process. For example, the base clip process is executed as follows. After a middle/high-frequency signal is obtained by applying a BPF (band-pass filter) to an input signal, a given value is subtracted from the absolute value signal of the middle/high-frequency signal. In this case, levels that assume negative values are determined as noise levels, and are clipped to zero, thus removing noise. Furthermore, the signal that has undergone the above process is multiplied by a given coefficient to attain edge emphasis, i.e., to emphasize a high-frequency signal, and a signal obtained by restoring the original sign of the emphasized signal is added to the input signal. In this manner, an edge-emphasized signal from which noise components have been removed can be obtained.

When a luminance signal undergoes nonlinear conversion such as γ correction or the like, a high-frequency signal is relatively emphasized on the dark side with respect to the bright side. To avoid this, a method of changing an edge correction amount depending on a luminance signal is known.

However, since the amount of noise contained in a video signal obtained from a solid-state image sensing element changes depending on a signal level input to the solid-state image sensing element, if a uniform base clip process is done, an appropriate base clip process for a given input level may turn into an inappropriate one for another input level.

Even when the edge correction amount is changed depending on the luminance signal, an effect of making noise inconspicuous is obtained by dropping the signal level, but an effect of removing noise cannot be expected.

The relationship before and after the aforementioned processes of a high-frequency signal will be explained below with reference to FIG. 20. In FIG. 20, a indicates a relationship without any processes. By calculating the absolute value of the BPF result, input/output relationship b is obtained. By clipping levels, which assume negative values after subtraction of a given value, to zero, relationship c is obtained. Relationship d is obtained by restoring the original sign, and relationship e is obtained by finally applying a gain.

This base clip process is uniformly done for an image, as described above.

However, since a person experiences different noise levels depending on whether an object on which noise is superposed has less or large frequency change, it is preferable to change the base clip process depending on an object. That is, as the frequency characteristics of an object have a stronger resemblance to those of noise, a person is more likely to not perceive noise as noise but to perceive it as a signal that the object naturally has. Hence, the base clip process is not so required. By contrast, as the frequency characteristics of an object are farther from those of noise, noise becomes more conspicuous, and the necessity of the base clip process increases.

In the conventional method, since the base clip process is set independently of the frequency characteristics of an object, a given base clip amount is applied even to a portion that does not require high base clip effect, thus bringing about an image blur. By contrast, a sufficiently large base clip amount cannot be applied to a portion that requires high base clip effect, thus producing noise.

SUMMARY OF THE INVENTION

The present invention has been made to solve the aforementioned problems, and has as its object to provide an edge correction apparatus and method, program, and storage medium, which can implement optimal base clip processes to different noise levels in accordance with the level of an input signal.

It is another object of the present invention to provide an edge correction apparatus and method, program, and storage medium, which can change the base clip amount in correspondence with the frequency characteristics of an input signal.

In order to solve the above problems and to achieve the above objects, an edge correction apparatus according to the first aspect of the present invention is characterized by comprising a high-frequency extraction device for extracting a high-frequency signal not less than a predetermined frequency from an input signal, a suppression device for suppressing signal components not more than a suppression level from the extracted high-frequency signal, a setting device for setting the suppression level in correspondence with a signal level of the input signal, and a high-frequency emphasis device for emphasizing the high-frequency signal suppressed by the suppression device.

An edge correction method according to the first aspect of the present invention is characterized by comprising the high-frequency extraction step of extracting a high-frequency signal not less than a predetermined frequency from an input signal, the suppression step of suppressing signal components not more than a suppression level from the extracted high-frequency signal, the setting step of setting the suppression level in correspondence with a signal level of the input signal, and the high-frequency emphasis step of emphasizing the high-frequency signal suppressed in the suppression step.

A program according to the first aspect of the present invention is characterized by making a computer execute the aforementioned edge correction method.

A storage medium according to the first aspect of the present invention is characterized by computer readably storing the aforementioned program.

An edge correction apparatus according to the second aspect of the present invention is characterized by comprising a high-frequency emphasis device for emphasizing a high-frequency signal not less than a predetermined frequency of an input signal, a suppression device for suppressing noise of the high-frequency signal emphasized by the high-frequency emphasis device, and a control device for controlling a suppression level used to suppress the noise of the input signal by the suppression device in accordance with frequency characteristics of the input signal.

An edge correction method according to the second aspect of the present invention is characterized by comprising the high-frequency emphasis step of emphasizing a high-frequency signal not less than a predetermined frequency of an input signal, the suppression step of suppressing noise of the high-frequency signal emphasized in the high-frequency emphasis step, and the control step of controlling a suppression level used to suppress the noise of the input signal in the suppression step in accordance with frequency characteristics of the input signal.

A program according to the second aspect of the present invention is characterized by making a computer execute the aforementioned edge correction method.

A storage medium according to the second aspect of the present invention is characterized by computer readably storing the aforementioned program.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 shows the color filter matrix of a CCD;

FIG. 12 is a flow chart showing the operation of an edge correction circuit;

DETAILED DESCRIPTION OF THE PREFERRED EMBODIMENTS

Preferred embodiments of the present invention will be described in detail hereinafter with reference to the accompanying drawings.

First Embodiment

Figure 1:
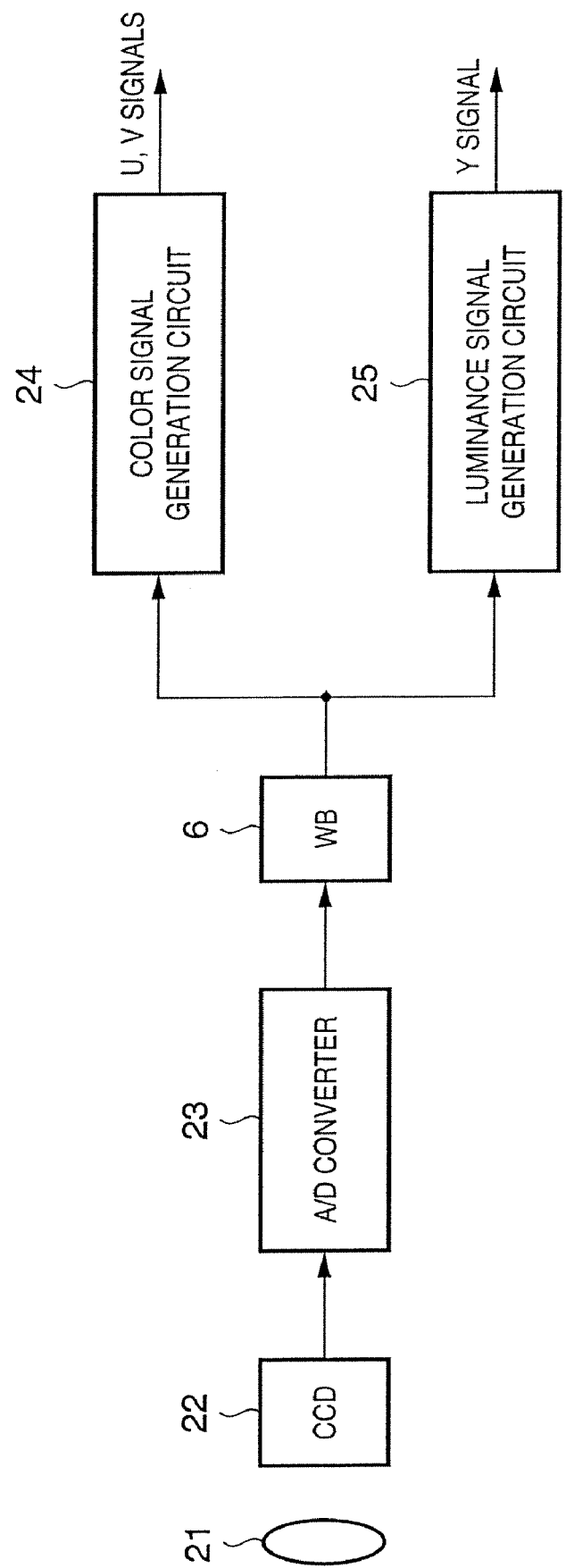
FIG. 1 is a schematic block diagram showing some components of an image sensing device which utilizes the first embodiment of an edge correction circuit according to the present invention.

FIG. 1 is a schematic diagram of an image sensing device that utilizes the first embodiment of an edge correction circuit according to the present invention. Light that has been transmitted through a lens 21 is received by a CCD 22, and an output signal from the CCD 22 is converted into a digital signal by an A/D converter 23. The digital signal undergoes white-balance adjustment by a WB (white balance) circuit 6. Based on this signal, a color signal generation circuit 24 then generates color difference signals U and V, and a luminance signal generation circuit 25 generates a luminance signal Y, thus obtaining a color image.

Figure 2:
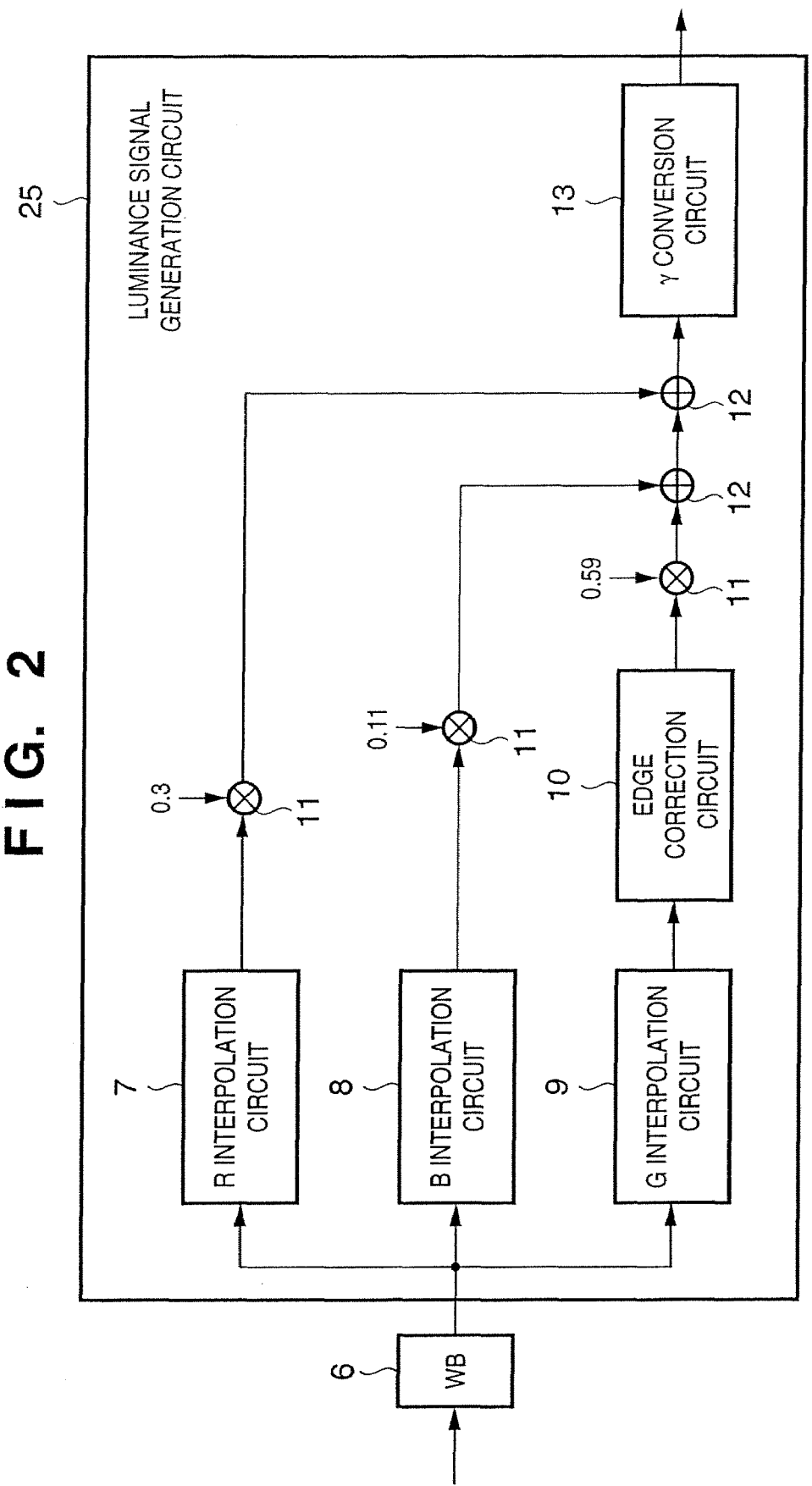
FIG. 2 is a detailed block diagram of a luminance processing part in FIG. 1.

The luminance signal generation circuit 25 will be described below with reference to FIG. 2.

Assume that the CCD has a Bayer matrix shown in FIG. 3. A luminance signal undergoes white balance adjustment by the WB (white balance) circuit 6, and is then input to R, B, and G interpolation circuits 7, 8, and 9 to undergo red, blue, and green color interpolation processes for respective pixels.

This color interpolation will be explained below taking a green signal as an example. Zero is inserted at pixel positions of the CCD other than green pixels. Then, a [1 2 1] LPF (low-pass filter) is applied in the horizontal and vertical directions. The figures in parentheses mean weighting factors with a central focus on position where the pixel is interpolated. For example, if G'22 represents a green signal at a position B22 after interpolation, it is given by:

$$G'22=(G12+G21+G23+G32)/4$$

Also, if G'23 represents a green signal at a position G23 after interpolation, it is given by:

$$G'23=(G12+G14+4\times G23+G32+G34)/8$$

When the same process is executed for other pixel positions, an interpolated green signal can be obtained. The same applies to R and B interpolation processes, and red and blue signals can be obtained.

An edge correction circuit 10 makes edge correction of a green signal, as will be described later, a multiplier 11 multiplies red, blue, and green signals by given coefficients, respectively, and an adder 12 adds these products. Furthermore, a γ conversion circuit 13 makes γ conversion to obtain a luminance signal.

The edge correction circuit of this embodiment is used in such image sensing device. The above description has merely exemplified an image sensing device, but does not limit the use form of an edge correction circuit.

The edge correction circuit 10 will be described in detail below.

Figure 4:
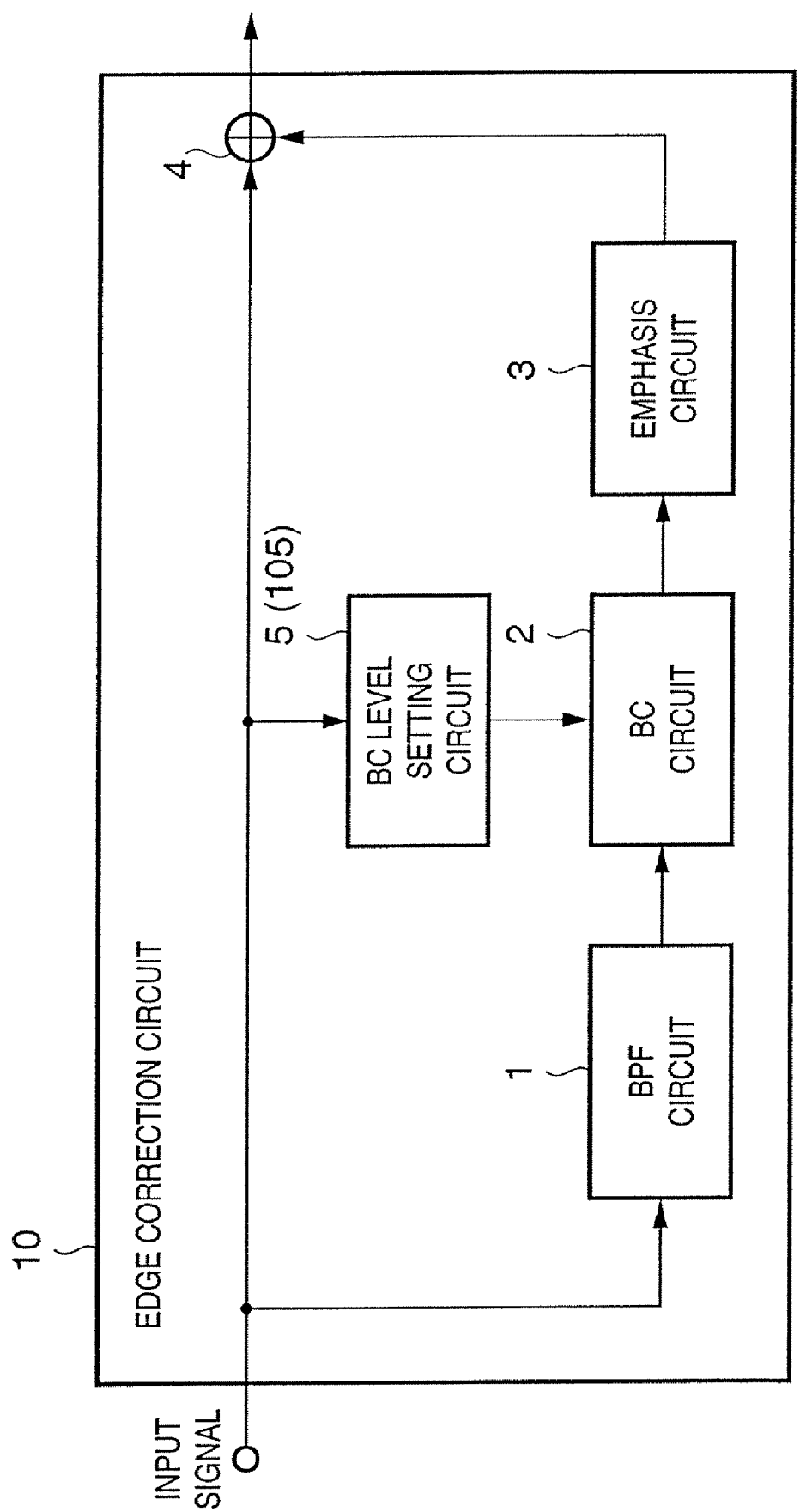
FIG. 4 is a schematic block diagram of an edge correction circuit according to the first embodiment of the present invention.

FIG. 4 is a block diagram showing the arrangement of the edge correction circuit 10 of the first embodiment.

A BPF circuit 1 applies a BPF (band-pass filter) to an input signal (G signal) to obtain a middle/high-frequency signal equal to or higher than a predetermined frequency. A BC (base clip) circuit 2 clips the level of a signal (noise component) equal to or lower than a given amplitude level (base clip level) to zero, and removes it from the middle/high-frequency signal. The base clip level (suppression level) determined to be a noise component is set by a BC level setting circuit 5. An emphasis circuit 3 multiplies the middle/high-frequency signal, in which the noise component has been suppressed, by a given coefficient. With these circuits, the middle/high-frequency signal, in which the noise component has been suppressed, can be emphasized, and an adder 4 adds this emphasized signal to the input signal, thus obtaining a middle/high-frequency signal in which the noise component has been suppressed.

The BC circuit 2 and BC level setting circuit 5 will be described in more detail below.

Figure 5:
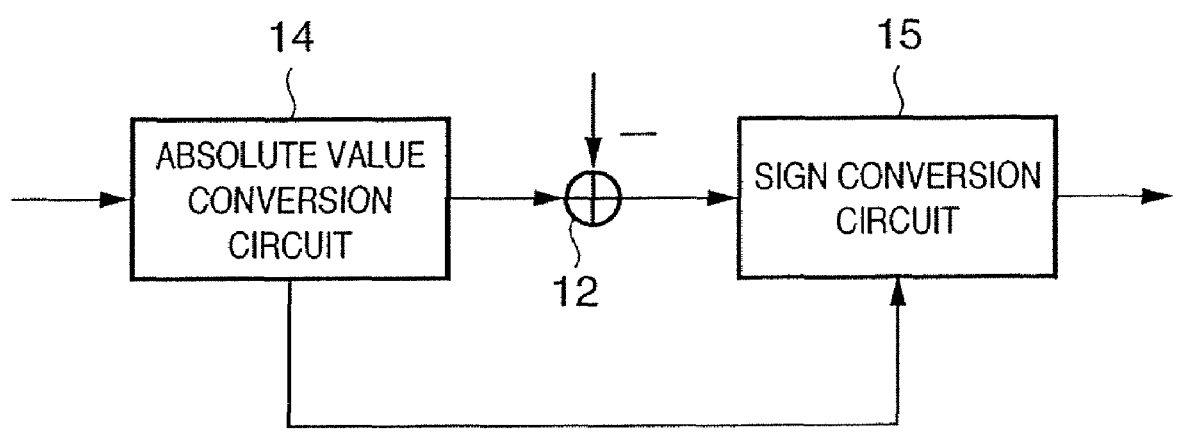
FIG. 5 is a block diagram showing the arrangement of a base clip circuit in the first embodiment.

In the BC circuit 2, as shown in FIG. 5, an absolute value conversion circuit 14 converts the middle/high-frequency signal into an absolute value signal, and an adder 12 subtracts a given amount from the absolute value signal. In this case, the amount to be subtracted is set by the BC level setting circuit 5. A sign conversion circuit 15, levels (base clip levels) of the middle/high-frequency signal, which assume negative values as a result of subtraction, are clipped to zero, and the sign of the remaining signal components is restored to the original sign. In this manner, the base clip process is done.

The BC level setting circuit 5 can set the base clip level on the basis of a noise amount with respect to the input signal level. For example, let k be the input signal level, b be the level of CCD dark noise, and f(k) be the level of optical shot noise. Then, a noise amount n(k) with respect to the input signal level is given by:

$$n(k)=f(k)+b$$

Figure 6:
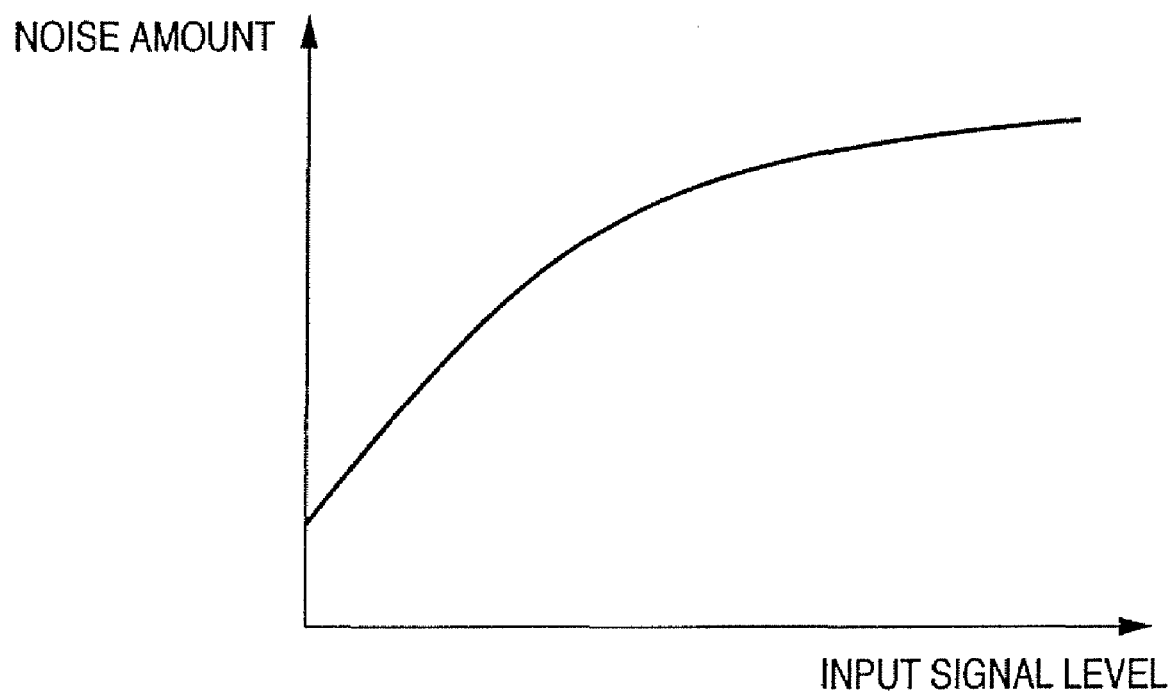
FIG. 6 is a graph showing an example of the relationship between the input signal level and noise amount.
Figure 7:
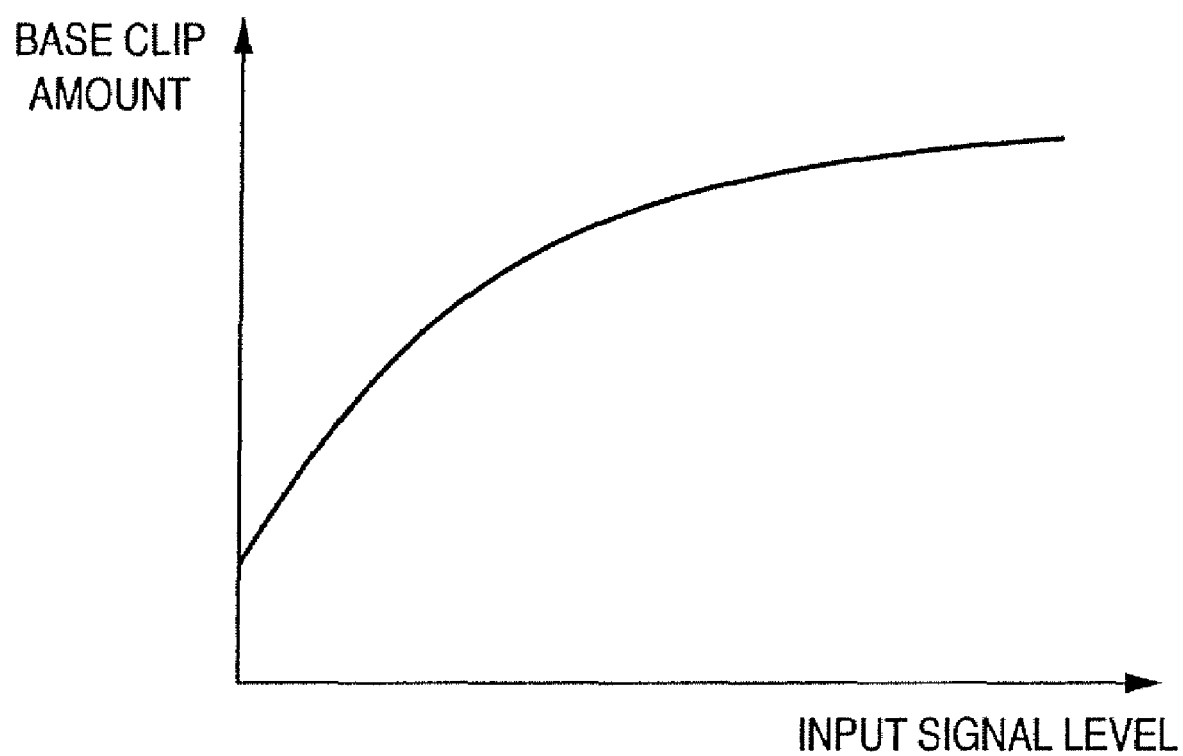
FIG. 7 is a graph showing an example of the relationship between the input signal level and base clip amount.

The noise amount n(k) changes, as shown in FIG. 6. In this case, the base clip level is to be set in proportion to noise level n(k). FIG. 7 shows the relationship between the input signal level and base clip amount (level).

Figure 8:
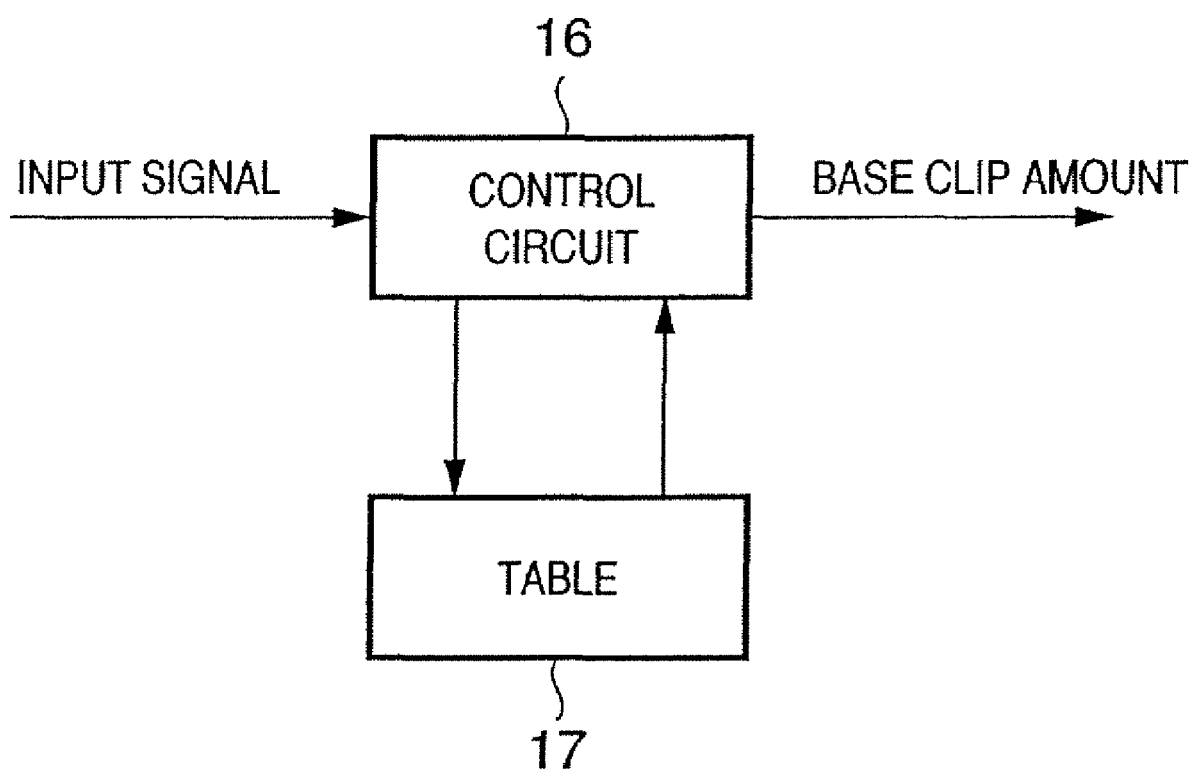
FIG. 8 is a block diagram showing an example of a BC level setting circuit in the first embodiment.

The BC level setting circuit 5 may store a table of the input signal vs. base clip amount relationship on a memory, and may look up that table, as shown in FIG. 8. Alternatively, a function of the input signal vs. base clip amount relationship may be generated, and the base clip level may be obtained by a calculation.

Using the aforementioned circuit, an edge-corrected image in which noise is optimally suppressed can be obtained.

Note that the base clip amount (level) is determined using the input signal itself. Alternatively, the base clip amount may be determined using a signal obtained by applying a low-pass filter to the input signal, or a luminance signal which is generated independently.

FIG. 12 is a flow chart showing the operation of the edge correction circuit of this embodiment.

In step S1, a BPF (band-pass filter) is applied to an input signal to extract middle/high-frequency signal equal to or higher than a predetermined frequency.

In step S2, the BC level setting circuit 5 sets a subtraction amount to be subtracted from the input signal on the basis of the input signal level and a table or the like.

In step S3, the middle/high-frequency signal extracted in step S1 is converted into an absolute value, and the subtraction amount set in step S2 is subtracted from that value. Levels which assume negative values as a result of subtraction are clipped as base clip levels to zero. After that, the sign of the remaining signal components is restored to that before absolute value conversion. In this way, a middle/high-frequency signal in which noise components have been suppressed can be obtained.

In step S4, the middle/high-frequency signal obtained in step S3 is multiplied by a given coefficient, thus emphasizing this middle/high-frequency signal.

In step S5, the middle/high-frequency signal emphasized in step S4 is added to the input signal.

With the above operation, an edge-corrected image in which noise is optimally suppressed can be obtained.

Second Embodiment

The second embodiment of the present invention will be described below.

Figure 9:
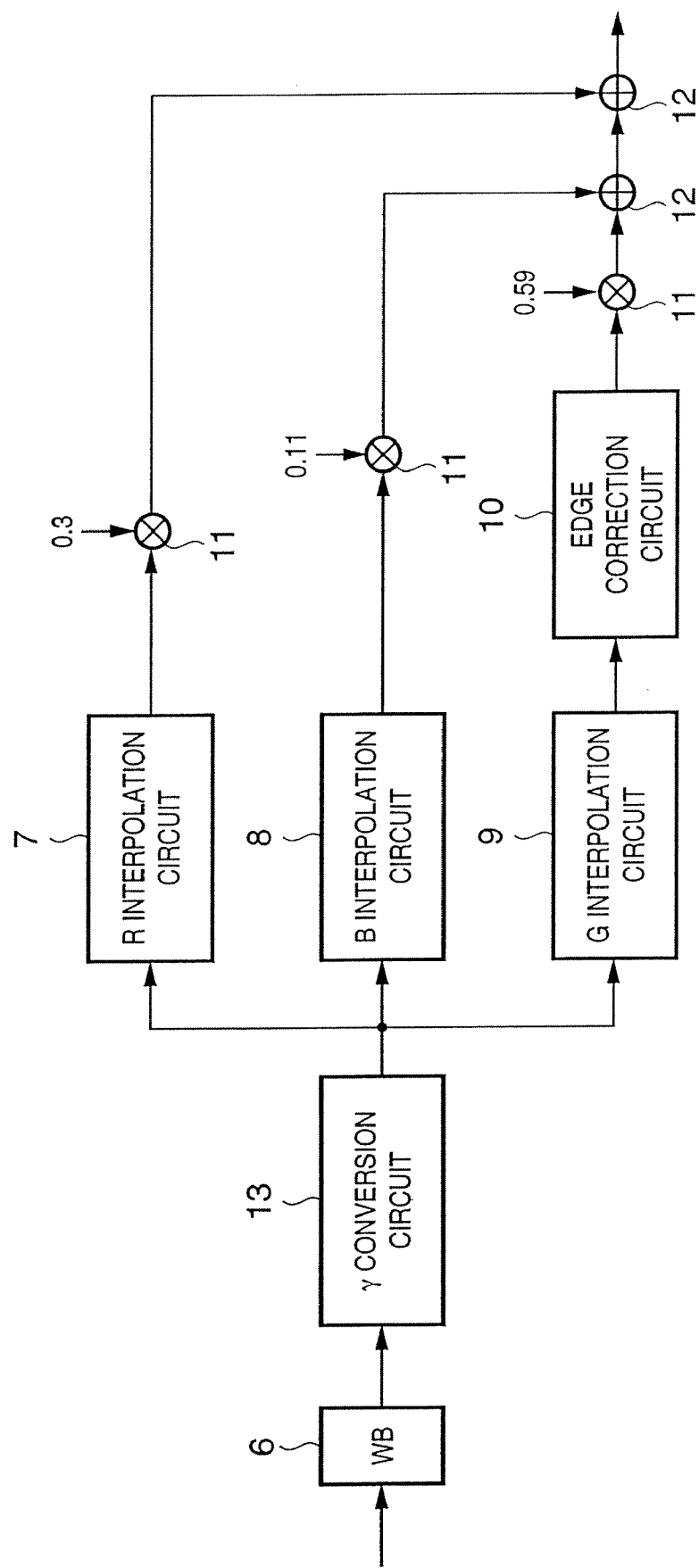
FIG. 9 is a block diagram showing some components of an image sensing device which utilizes the second embodiment of an edge correction circuit according to the present invention.

FIG. 9 is a block diagram showing some components of an image sensing device, which uses an edge correction circuit according to the second embodiment of the present invention. The image sensing device in FIG. 9 has substantially the same arrangement as that of the first embodiment shown in FIG. 1, except for the position of the γ conversion circuit.

In this embodiment, the base clip setting amount (setting level) with respect to the input signal level is different from that in the first embodiment due to a change in position of the γ conversion circuit.

In this embodiment, a signal which has undergone white balance correction is immediately input to the γ conversion circuit. This γ conversion circuit has characteristics that emphasize signal components on the dark side, and suppress those on the bright side, since it is used to cancel the output characteristics of a monitor. For this reason, the noise amount increases on the dark side, and decreases on the bright side.

Figure 10:
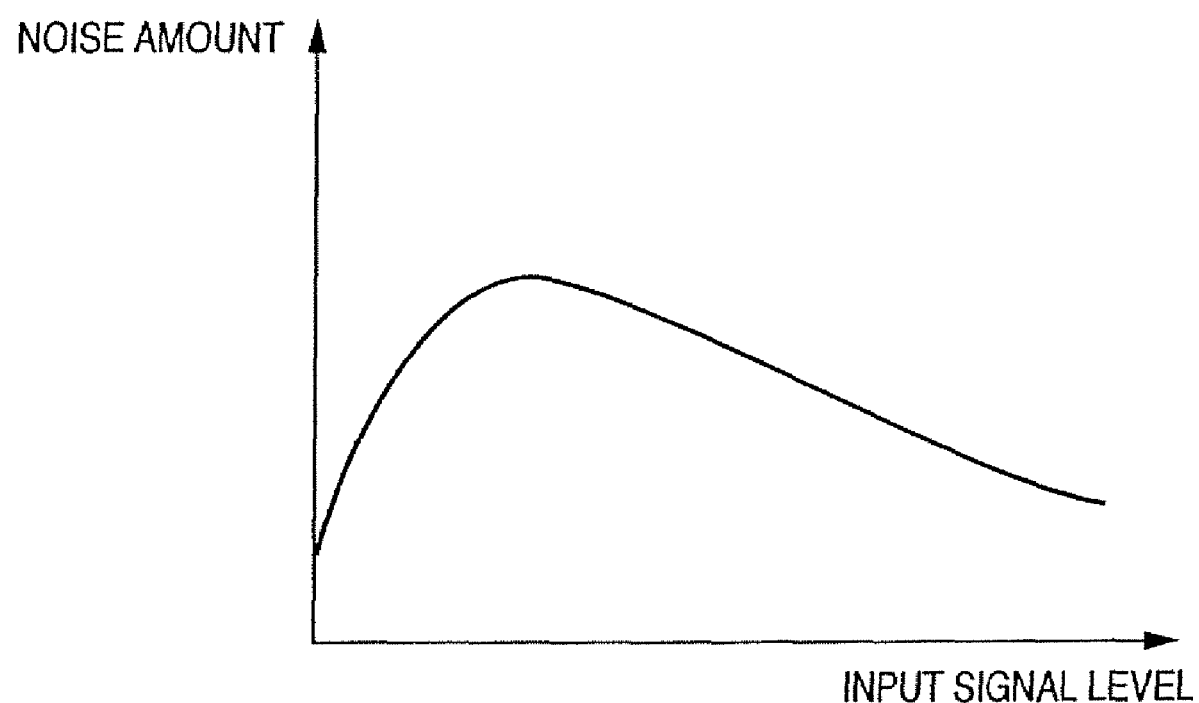
FIG. 10 is a graph showing an example of the relationship between the input signal level and noise amount after γ conversion.

Also, since an initial noise amount generated by the CCD monotonously increases with respect to the input signal level, as indicated by the characteristics shown in FIG. 7, the noise amount after γ conversion temporarily increases and then decreases, as shown in FIG. 10.

Figure 11:
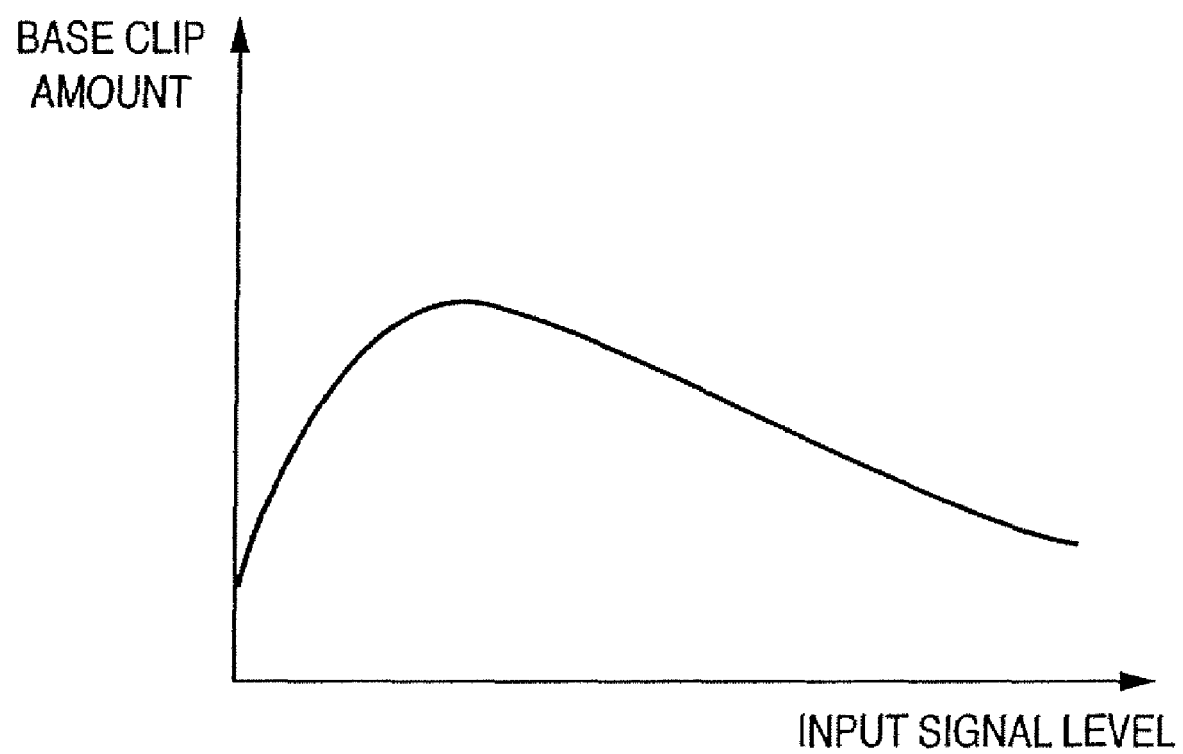
FIG. 11 is a graph showing an example of the relationship between the input signal level and base clip amount.

Therefore, in this embodiment, it is effective to set the relationship between the input signal level and base clip amount (level so that the base clip amount monotonously increases as the input signal level increases, and then decreases, as shown in FIG. 11.

As described above, according to the first and second embodiments, even when the noise level changes depending on the signal level, an edge correction apparatus which can execute a base clip process optimal to that noise level can be realized.

Third Embodiment

A BC level setting circuit 105 according to the third embodiment of the present invention will be described below. Note that the arrangement of the image sensing device, luminance signal generation circuit 25, and edge correction circuit 10 to which the BC level setting circuit 105 according to this embodiment is applied are the same as those in the first embodiment shown in FIGS. 1, 2, and 4.

Figure 13:
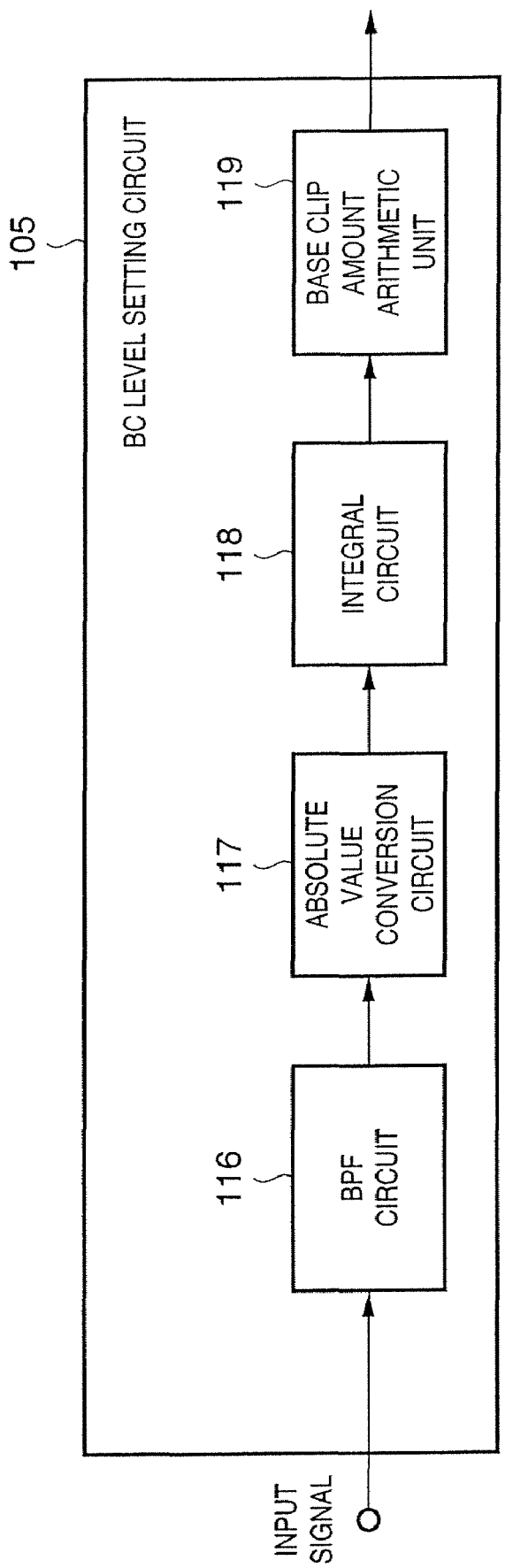
FIG. 13 is a schematic block diagram showing a BC level setting circuit according to the third embodiment of the present invention.

The BC level setting circuit 105 has the following circuits for the purpose of determining the base clip amount (level) in correspondence with the frequency characteristics of an object. FIG. 13 is a schematic block diagram showing the internal arrangement of the BC level setting circuit.

A BPF (band-pass filter) circuit 116 extracts a high-frequency signal from an input signal. By changing the characteristics of the BPF, the frequency characteristics to be extracted from an object can be changed. An absolute value conversion circuit 117 converts the high-frequency signal into an absolute value to check the absolute values of high-frequency components, and an integral circuit 118 calculates an integral value of surrounding pixels of a pixel of interest. For example, the integral circuit 118 integrates for a 4 (pixels)×4 (pixels) area. By calculating such local integral value, the amount of a high-frequency component in a local area of the object can be obtained. Finally, a base clip amount arithmetic unit 119 determines a base clip amount (level) based on the integral value.

This process will be explained in more detail below. The BPF circuit 116 applies, e.g., a [−1, 0, 2, 0, −1] digital filter in both the horizontal and vertical directions. By applying this digital filter, high-frequency components in an oblique direction are extracted. The frequency characteristics of a BPF to be adopted can be changed depending on the noise characteristics of the CCD and an object.

The integral circuit 118 integrates the values of, e.g., 4×4 pixels around the pixel of interest. However, since a large circuit scale is required to integrate in the vertical direction, for example, the circuit 118 may integrate, e.g., 4×1 pixels. When this integral area is too small, the frequency characteristics of noise itself are unwantedly checked in place of those of an object. Conversely, when this area is too large, the frequency characteristics of a plurality of objects are undesirably mixed.

Figure 14:
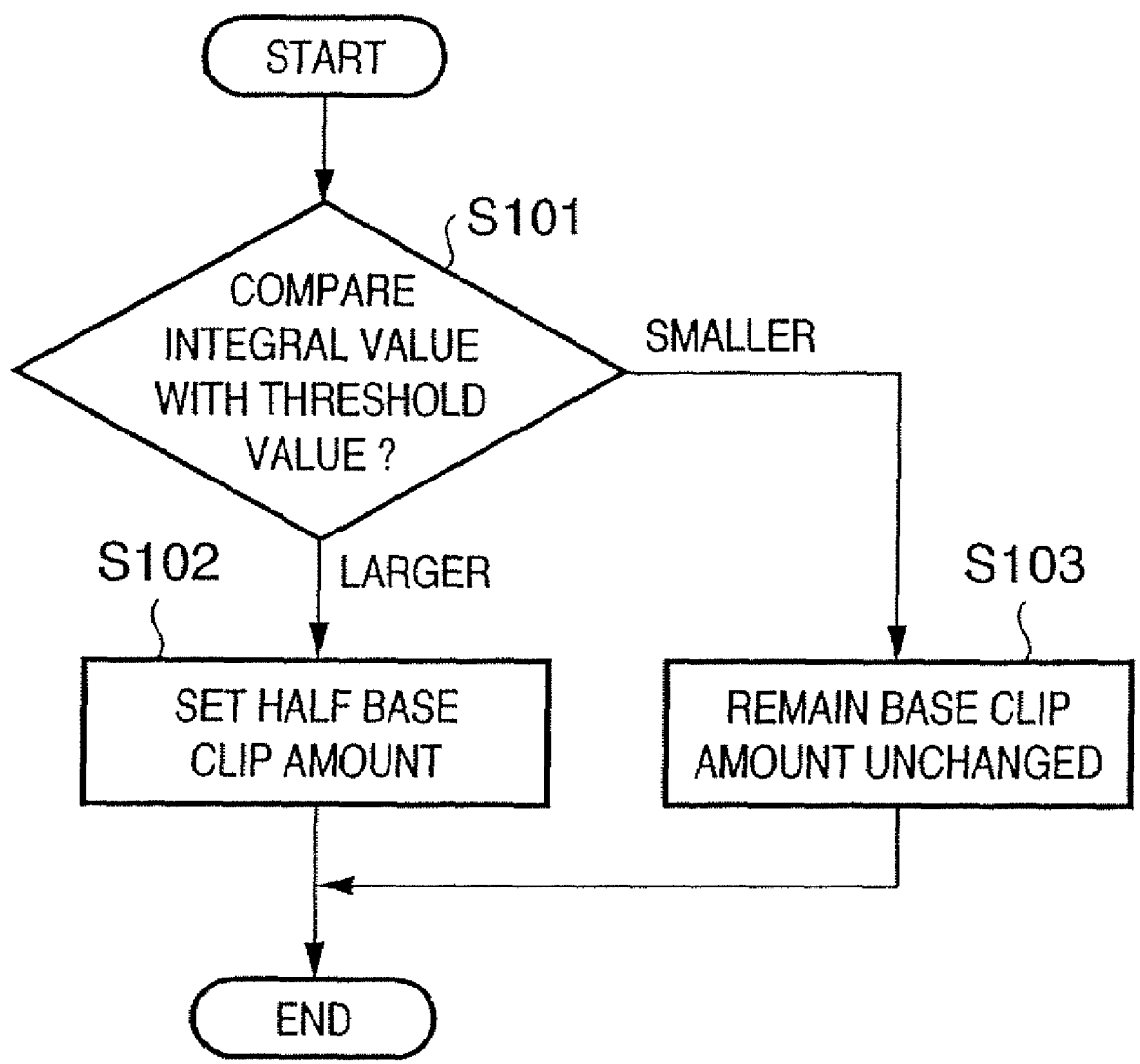
FIG. 14 is a flow chart showing the process in a base clip arithmetic unit.

FIG. 14 shows the flow of a processing example in the base clip amount arithmetic unit 119.

Figure 15:
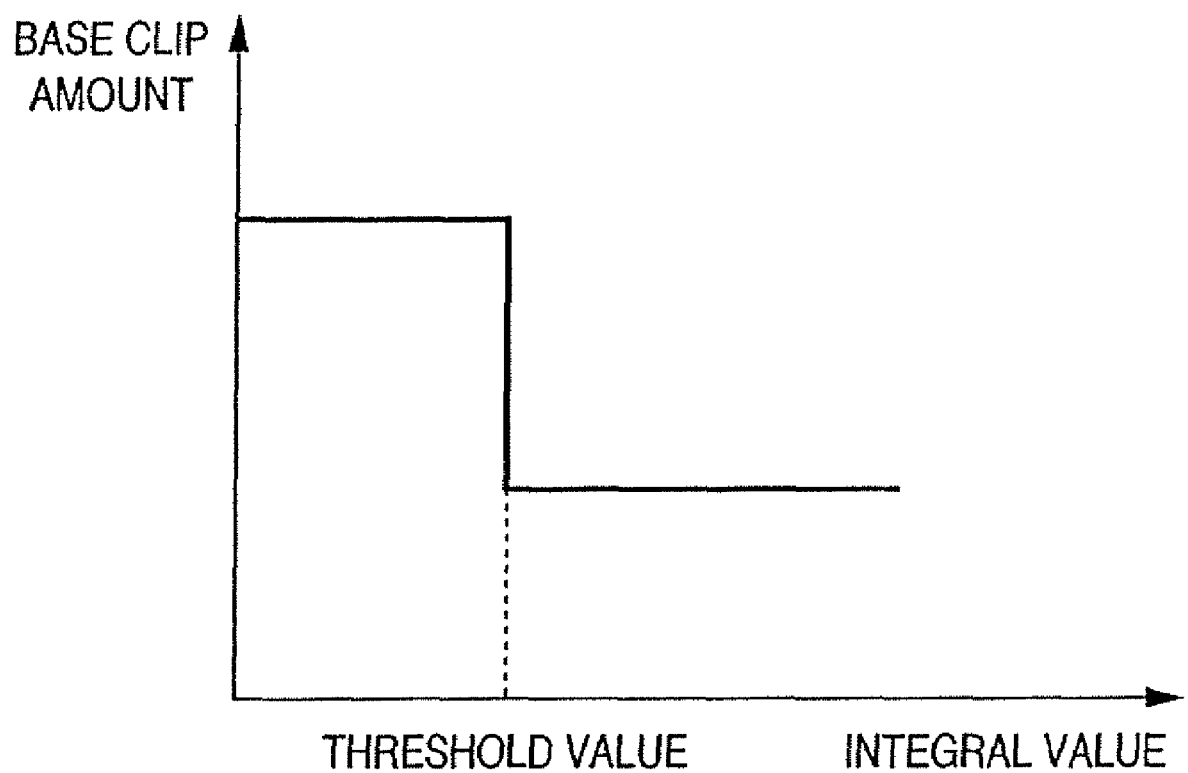
FIG. 15 is a graph showing the relationship between the integral value of a BPF and the base clip amount.
Figure 16:
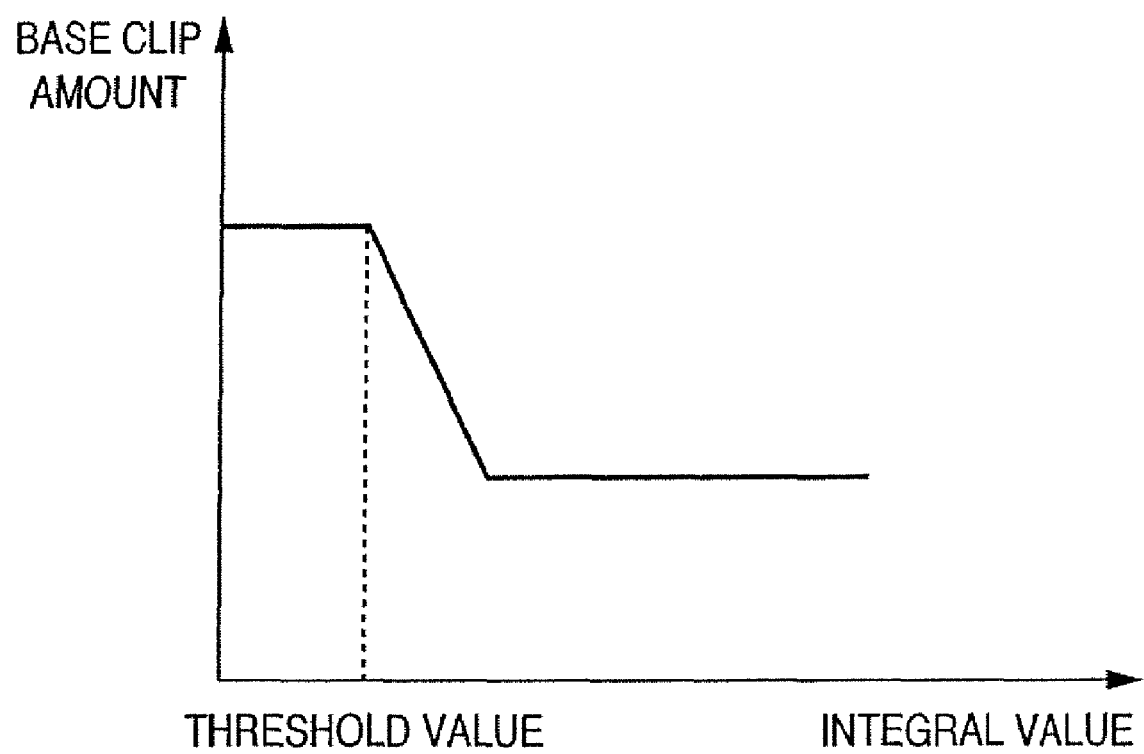
FIG. 16 is a graph showing the relationship between the integral value of a BPF and the base clip amount.

In step S101, the integral value is compared with a threshold value, which is set in advance. If the integral value is larger than the threshold value, i.e., if it is determined that a signal has high frequency characteristics like those of an object having a stripe pattern, a base clip level, which is set in advance, is set to be half, e.g., the maximum base clip level, in step S102. If the integral value is smaller than the threshold value, i.e., if it is determined that a signal has low frequency characteristics like those of a monochrome object, the base clip amount (level) remains unchanged. FIG. 15 shows the relationship between the integral value and base clip amount. In order to avoid the base clip amount (level) from abruptly changing based on the threshold value, a relationship shown in FIG. 16 may be used.

As described above, when the frequency characteristics of an object are similar to the high frequency characteristics of noise, i.e., when a signal has high frequency characteristics like those of an object having a stripe pattern, the base clip amount is reduced. On the other hand, when the frequency characteristics of an object are not similar to the high frequency characteristics of noise, i.e., when a signal has low frequency characteristics like those of a monochrome object, the base clip amount is raised.

Using the aforementioned circuit, an edge correction circuit which can set a base clip amount (level) optimal to an image in accordance with the image can be obtained.

Fourth Embodiment

This embodiment allows to set the base clip amount in consideration of the luminance level of an object, in addition to the base clip level control of the third embodiment that suppresses noise components of a high-frequency signal.

In this embodiment, the base clip level is controlled not to be reduced for a high-luminance portion in consideration of the fact that the noise level becomes larger with increasing luminance of an object due to optical shot noise of the CCD.

Figure 17:
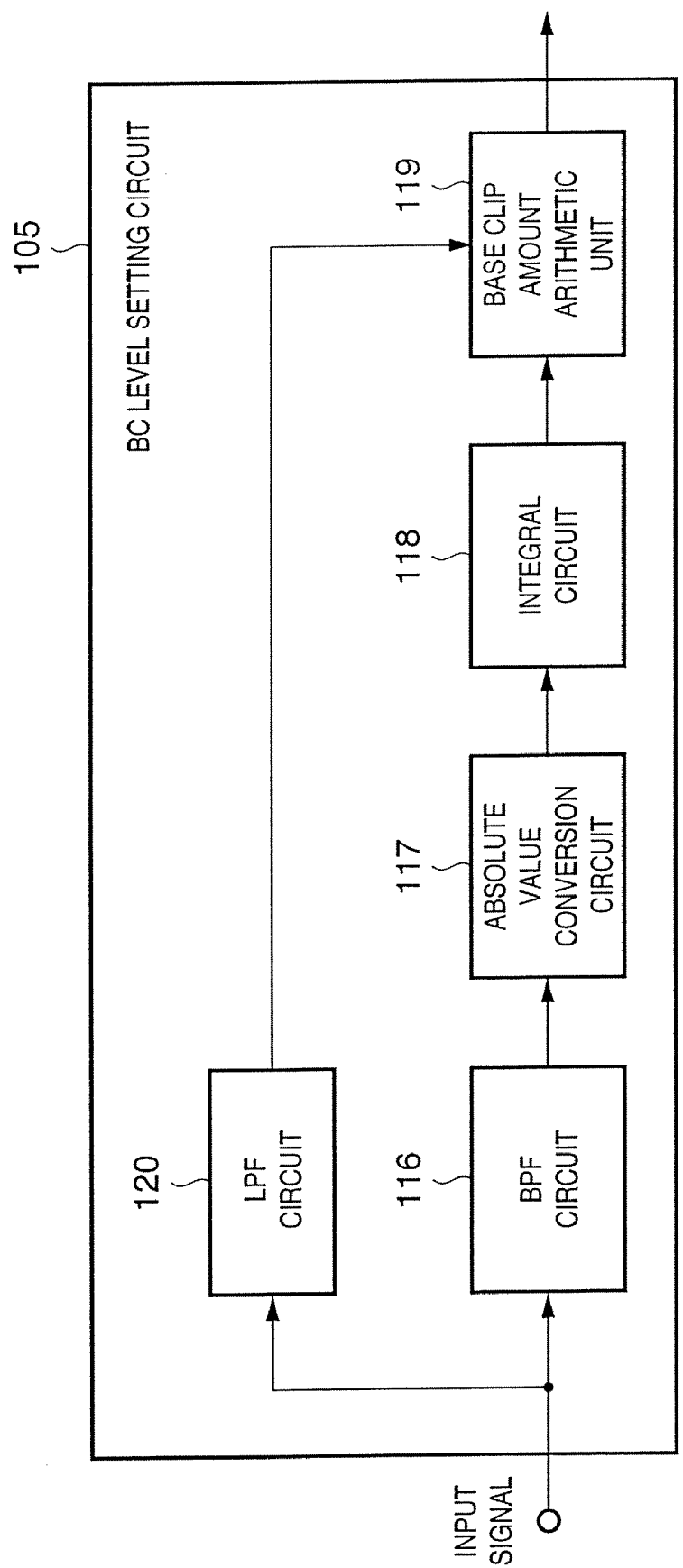
FIG. 17 is a schematic block diagram showing a BC level setting circuit according to the fourth embodiment of the present invention.

FIG. 17 is a block diagram showing some components of an image sensing device that uses an edge correction circuit according to the fourth embodiment of the present invention. In this device, an LPF (low-pass filter) circuit 120 is added to the BC level setting circuit (FIG. 13) of the third embodiment.

A repetitive description of portions that have been explained in the third embodiment will be avoided.

The LPF circuit 120 applies, e.g., a [1 2 1] filter in both the horizontal and vertical directions.

More specifically, if x22 represents the LPF result at a position B22 in FIG. 3, it is given by:

$$x22=(R11+2\times G12+R13+2\times G21+4\times B22+2\times G23+R31+2\times G32+R33)/16$$

This LPF result can be considered as the luminance level of an object.

Figure 18:
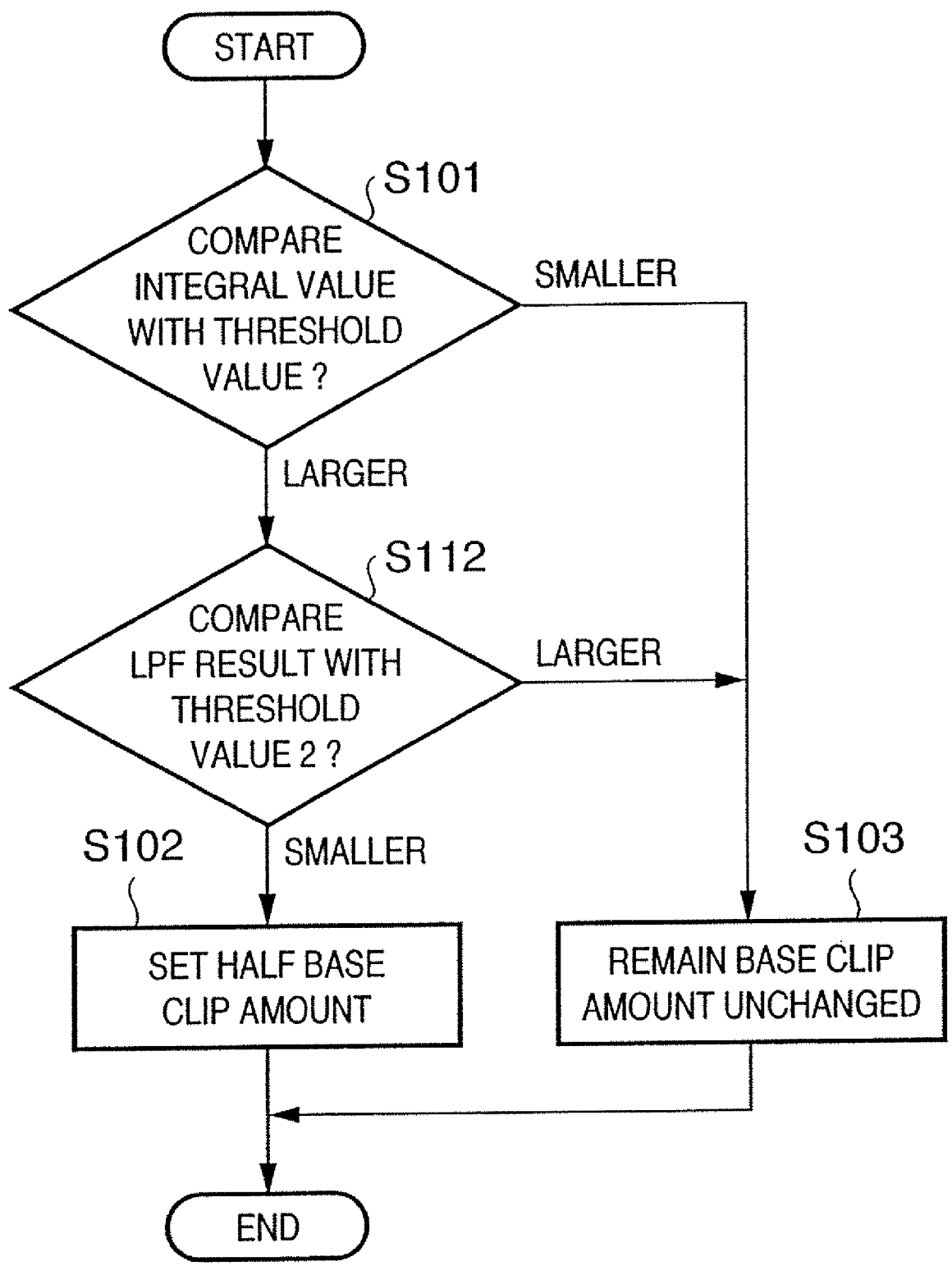
FIG. 18 is a flow chart showing the process in a base clip arithmetic unit in the fourth embodiment.

In this embodiment, the base clip arithmetic unit 119 calculates the base clip amount (level) using the LPF result in addition to the third embodiment. FIG. 18 shows an example of its flow.

Step S112 is added to the flow chart of the third embodiment. That is, if it is determined in step S101 that the integral value is larger than the threshold value, the LPF result is compared with threshold value 2 in step S112. If the LPF result is larger than threshold value 2, the base clip level remains unchanged in step S103; if the LPF result is smaller than threshold value 2, the base clip level is set to be half the maximum level.

With this arrangement, when the luminance of an object is high or when the frequency range of an object includes less high-frequency components although its luminance is low, the base clip level is controlled not to be reduced and, hence, noise can be suppressed. On the other hand, when the luminance of an object is low and its frequency range includes many high-frequency components, the base clip level is reduced and, hence, the resolving power of, e.g., dark green trees can be enhanced.

Fifth Embodiment

This embodiment adaptively executes the base clip amount (level) control of the third embodiment in correspondence with CCD noise.

As has also been explained in the fourth embodiment, CCD noise includes noise components, which increase with increasing luminance of an object, in addition to dark current noise. For example, a change in luminance shown in FIG. 6 takes place.

Therefore, when a high-frequency signal is to be extracted using the BPF to check the frequency characteristics of an object, a noise amount increases with increasing luminance of an object, and the BPF result also increases in some cases. In such case, even when an object has low frequency characteristics and the base clip level is not required to be reduced, a large BPF result is obtained due to many noise components, and the base clip level is reduced unwantedly.

Figure 19:
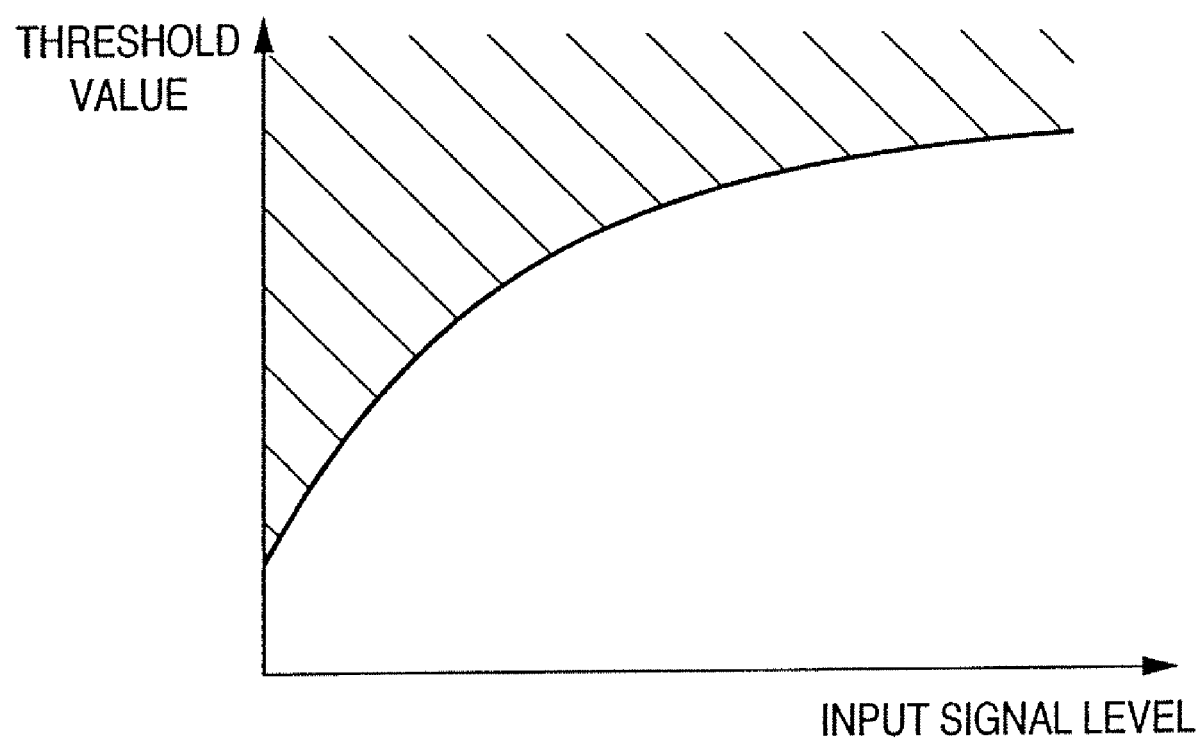
FIG. 19 is a graph showing an example of the relationship between the input signal level and threshold value to be set in the third embodiment.
Figure 20:
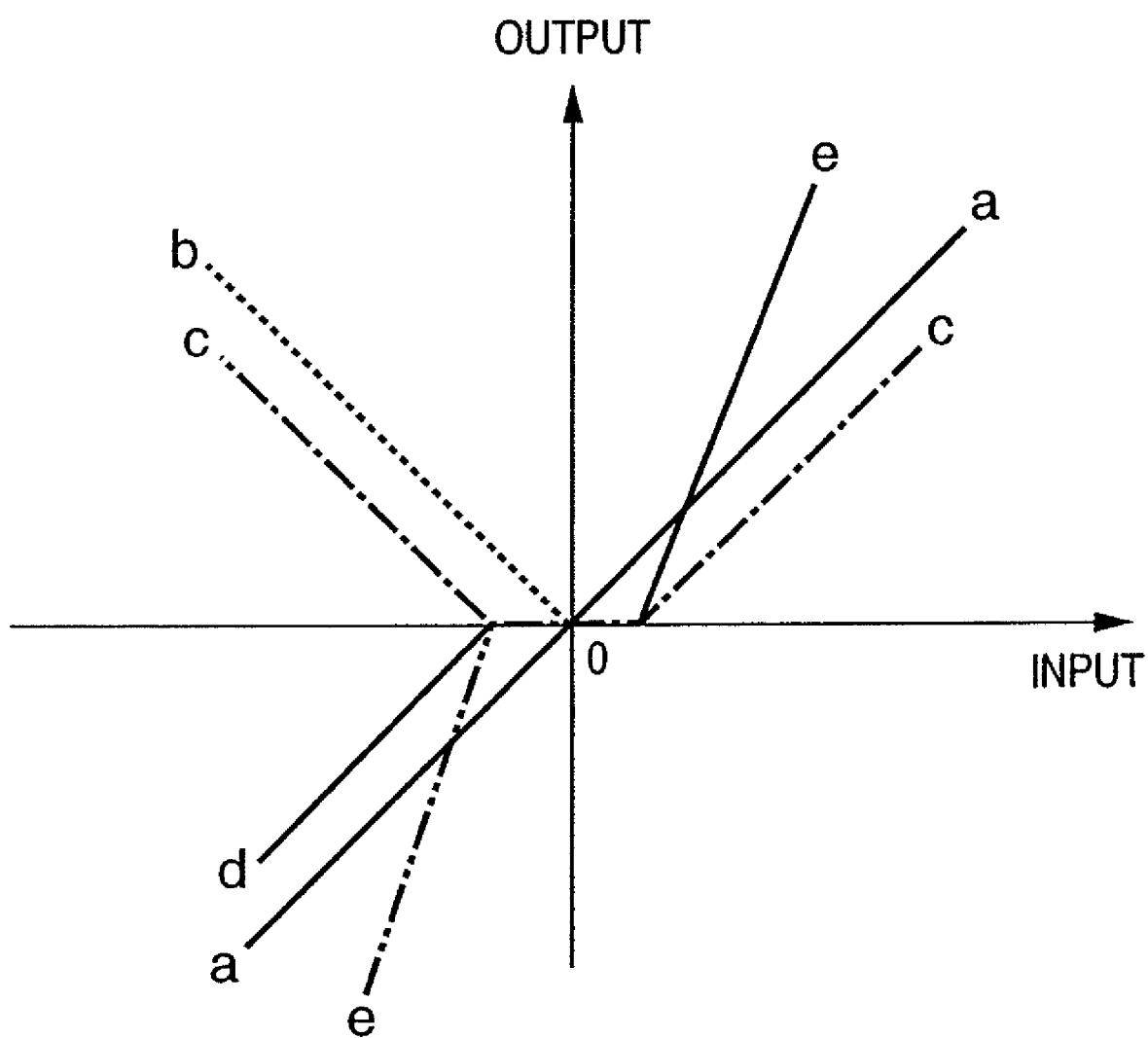
FIG. 20 is a graph showing the input/output relationship of signals before and after a conventional base clip process.

To avoid such control, the threshold value is changed in correspondence with the luminance level of an object in the relationship between the integral value and base clip amount shown in FIG. 15, which is used in the description of the third embodiment. In this case, the threshold value is changed in a pattern similar to the relationship between the input signal level and noise amount, as shown in, e.g., FIG. 19. In this manner, the base clip amount can be, e.g., halved in the hatched portion of FIG. 19.

With this arrangement, since the threshold value becomes higher with increasing input signal level, for example, even when a large BPF integral result is obtained due to many noise components of a high-luminance object, noise can be prevented from being produced due to the reduced base clip level.

In the description of the third to fifth embodiments, after the base clip process is attained by subtracting the subtraction amount, which is set according to the frequency characteristics of an input signal, from the absolute value of the extracted high-frequency signal, that input signal is emphasized. Alternatively, a circuit for emphasizing an input signal by multiplying it by a gain may be inserted before the circuit for subtracting the subtraction amount, which is set in accordance with the frequency characteristics of the input signal, so as to emphasize the input signal in advance, and the subtraction amount may be subtracted from that input signal to remove noise components.

As described above, according to the first and second embodiments, base clip processes optimal to different noise levels depending on the level of an input signal can be implemented.

According to the third to fifth embodiments, the base clip amount can be changed in correspondence with the frequency characteristics of an input signal.

Other Embodiment

The objects of the respective embodiments are also achieved by supplying a storage medium (or recording medium), which records a program code of a software program that can implement the functions of the aforementioned embodiments to the system or apparatus, and reading out and executing the program code stored in the storage medium by a computer (or a CPU or MPU) of the system or apparatus. In this case, the program code itself read out from the storage medium implements the functions of the aforementioned embodiments, and the storage medium which stores the program code constitutes the present invention. The functions of the aforementioned embodiments may be implemented not only by executing the readout program code by the computer but also by some or all of actual processing operations executed by an operating system (OS) running on the computer on the basis of an instruction of the program code.

Furthermore, the functions of the aforementioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores program codes corresponding to the aforementioned flow charts.

The present invention is not limited to the above embodiments and various changes and modifications can be made within the spirit and scope of the present invention. Therefore, to apprise the public of the scope of the present invention the following claims are made.

What is claimed is:

1. An edge correction apparatus comprising:
a high frequency extraction device for extracting a high-frequency signal not less than a predetermined frequency from an input signal output from an image sensing element;
a suppression device for suppressing signal components according to a suppression level from the extracted high frequency pixel signals;
a setting device for setting the suppression level used by said suppression device in correspondence with a signal level of each pixel in the input signal,
a high-frequency emphasis device for emphasizing the high-frequency signal suppressed by said suppression device,
wherein said setting device sets the suppression level in unit of a pixel on the basis of the noise characteristics of the image sensing element, in which the noise level increases as the input signal level increases, and
wherein said setting devices sets the suppression level such that as the input signal level increases, the suppression level continuously increases with the amount of increase continuously becoming smaller, but not reaching zero, and
wherein the high-frequency emphasis device outputs a signal comprising corrected edges.

2. An edge correction method comprising:
extracting a high frequency signal not less than a predetermined frequency from an input signal output from an image sensing element;
suppressing signal components according to a suppression level from the extracted high frequency pixel signals;
setting the suppression level used in said suppressing step in correspondence with a signal level of each pixel in the input signal,
emphasizing the high-frequency signal suppressed in said suppression step,
wherein said setting step sets the suppression level in unit of a pixel on the basis of the noise characteristics of the image sensing element, in which the noise level becomes larger as the input signal level becomes larger, and
wherein said setting step sets the suppression level such that as the input signal level increases, the suppression level continuously increases with the amount of increase continuously becoming smaller, but not reaching zero, and
wherein the emphasizing step outputs a signal comprising corrected edges.

* * * * *